United States Patent

Nicolaisen et al.

[11] 4,032,739
[45] June 28, 1977

[54] SUPPORTING STRUCTURE FOR LEAF SPRING CONTACT ASSEMBLY

[75] Inventors: Holger Nicolaisen; Finn Schnoor Andersen, both of Nordborg, Denmark

[73] Assignee: Danfoss A/S, Nordborg, Denmark

[22] Filed: Oct. 9, 1975

[21] Appl. No.: 620,872

[30] Foreign Application Priority Data

Oct. 28, 1974 Germany ............... 2451135

[52] U.S. Cl. .................. 200/283; 200/246; 200/DIG. 46
[51] Int. Cl.² ...................... H01H 1/26
[58] Field of Search ........... 200/DIG. 46, 246, 283, 200/284, 1 A, 1 TK

[56] References Cited

UNITED STATES PATENTS

| | | | |
|---|---|---|---|
| 2,738,400 | 3/1956 | Hailes | 200/246 |
| 2,802,082 | 8/1957 | Kalwo | 200/283 X |
| 2,846,547 | 5/1958 | Pettet | 200/283 |
| 3,297,849 | 1/1967 | Rapata | 200/283 X |
| 3,588,414 | 6/1971 | Prickett | 200/283 X |
| 3,622,729 | 11/1971 | Ohno | 200/283 X |
| 3,751,618 | 8/1973 | Hallerberg | 200/283 X |
| 3,823,280 | 7/1974 | Obermann et al. | 200/283 X |

FOREIGN PATENTS OR APPLICATIONS 167,250  5/1959  Sweden ............... 200/283

Primary Examiner—James R. Scott

[57] ABSTRACT

The invention relates to an electrical type contact switch assembly. The assembly includes an insulated contact carrier having a U-shaped portion with spaced apart walls. A slot for receiving a leaf spring extends transversely through the walls. Mutually facing depressions formed in the walls straddle the slot and have oppositely inclined surfaces. A leaf spring disposed in the slot has a resiliently hinged flap extending at an acute angle relative to the plane of the spring. The flap is in resilient biasing engagement with the inclined surfaces of the contact carrier. The flap is of trapezium shape and is an integral part of the spring.

3 Claims, 5 Drawing Figures

SUPPORTING STRUCTURE FOR LEAF SPRING CONTACT ASSEMBLY

SUMMARY OF THE INVENTION

The invention relates to a holding device for a leaf spring, comprising a clamping portion held between two surfaces of a carrier.

The holding device is suitable for leaf springs of the most varied kind, e.g. purely mechanically loading springs as used in snap switches or also electrically effective leaf springs such as contact springs.

It is known, for example in relay contact springs, to provide a two-part carrier, to introduce the clamping portion of the leaf spring between the two carrier parts and then to interconnect the latter, whether by screw or adhesive, so that the leaf spring is securely held. However, this assembly is costly, especially if one carrier is provided for several leaf springs.

It has also to be considered that leaf springs are often required to be prestressed in the built-in condition. This can be achieved by giving the leaf springs a particular shape during manufacture. During mounting of the leaf springs care must be taken that the forces acting on the clamping portion do not influence the shape and thus the prestressing of the free portion of the leaf spring.

The invention is therefore based on the object of providing a leaf spring holding device of the aforementioned kind, which facilitates assembly and does not falsify the leaf spring characteristics.

This object is achieved according to the invention in that a lug is bent out of the clamping portion along a line extending longitudinally of the clamping portion and that the faces on a laterally open slot of the carrier are at such a fixed spacing from one another that, on abutment of the clamping portion against the first face, the lug bends and its edge lies against the second face.

In this construction a one-piece carrier may be used. For assembly, it is merely necessary to slide the clamping portion into the slot from the side. As a result of bending of the lug consisting of spring material, one obtains a considerable clamping force with which the edge of the lug is pressed against the second face or even pressed therein. Consequently the leaf spring receives a secure seating in the carrier. Despite the clamping forces exerted by the lug there is no impermissible deformation of the leaf spring because the lug bent out of the clamping portion stiffens the clamping portion in the longitudinal direction.

Desirably the lug is stamped out of the center of the clamping portion. The lug is thereby obtained entirely from the material of the clamping portion. Its edge lying against the second face is disposed substantially in the longitudinal medial plane of the clamping portion. The parts of the clamping portion remaining on both sides in conjunction with the bent-out lug give the clamping portion adequate stiffness.

It is also favorable if the lug lies against the second face only near its ends. At these positions particularly high clamping forces can be applied without the danger of deforming the clamping portion.

In a preferred embodiment, the slot has an enlargement intermediate its length, which receives the lug and provides the second face. By means of this enlargement the clamping portion is also positioned in the longitudinal direction, thereby providing an accurately defined position for the leaf spring.

The second face may be formed by at least one inclined shoulder bounding the enlargement. This inclined shoulder provides automatic centering of the lug in the center of the enlargement.

It is also favorable if the lug lies against the inclined shoulder with a corner. This provides very high surface pressure between the corner and the inclined shoulder, ensuring that the corner buries itself in the inclined shoulder if the latter is made from a material, e.g. plastics material, which is only a little softer than the spring sheet material. Consequently the leaf spring is securely seated.

In particular, the lug is of trapezium shape and connected to the clamping portion by the longer base line. The trapezium shape provides a corner, as is desired. The oblique side faces of the trapezium facilitate insertion of the clamping portion in the slot.

If the side of the slot opposite to the enlargement is provided with a symmetrically disposed second enlargement, assembly is simplified because it is unimportant as to from which side the lug is bent out. Unsymmetrically constructed leaf springs can be selected to have two different built-in positions.

For the purpose of saving material, it is possible to provide a cavity in the carrier between the inclined shoulders and beyond same.

BRIEF DESCRIPTION OF THE DRAWING

An example of the invention will now be described in more detail with reference to the drawing. In the drawing.

DESCRIPTION OF THE PREFERRED EMBODIMENT

Figure 1:
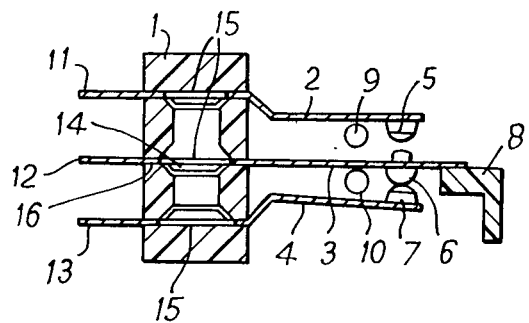
FIG. 1 is a longitudinal section through a carrier with three contact leaf springs.

FIG. 1 shows a carrier 1 of insulating material in which three leaf springs 2, 3 and 4 are held, each carrying a contact 5, 6 and 7. The central leaf spring 3 has a projection on which an actuating element 8 engages. The leaf spring 2 lies against the abutment 9 with a certain amount of prestressing. The central leaf spring 3 is prestressed to such as extent that it has overcome the prestressing of the leaf spring 4 and lifted the latter off the abutment 10. During lifting of the central leaf spring 3 by means of the actuating element 8, the leaf spring 4 follows up to the abutment 10. The central leaf spring 3 can lift the upper leaf spring 2 off the abutment 9 until it comes it lie against this abutment 9 itself. The free ends 11, 12 and 13 of the leaf springs serve as soldering lugs for connecting electric conductors.

Each leaf spring comprises a clamping portion 15 which is provided with a lug 14 and is inserted in a laterally open slot 16 of the housing. These conditions will be described in more detail in conjunction with FIGS. 2 to 5.

Figure 2:
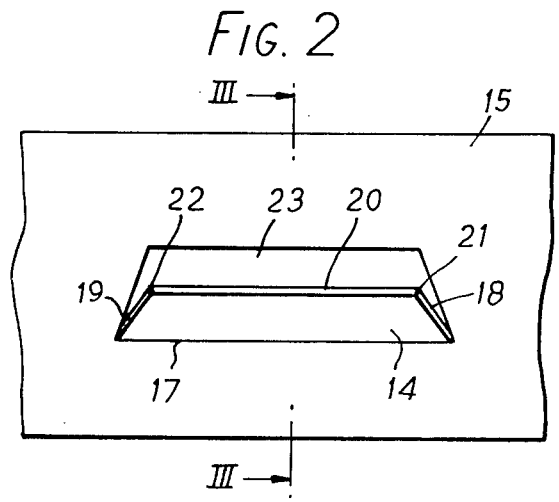
FIG. 2 is an enlarged fragmentary view of the clamping portion of the central leaf spring.
Figure 3:
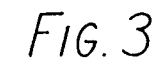
FIG. 3 is a cross-section on the line III—III in FIG. 2.

In FIG. 2 this clamping section 15 of the central leaf spring 3 is shown from below. The lug 14 is trapezium-shaped. It is bent out of the clamping portion 15 along its longer base line 17. It comprises two oblique edges 18 and 19 as well as an edge 20 parallel to the base line. The transitions are in the form of corners 21 and 22.

The lug is stamped out of the material of the clamping portion 15 to result in a central aperture 23. The edge 20 therefore lies substantially in the medial plane of the clamping portion 15.

Figure 4:
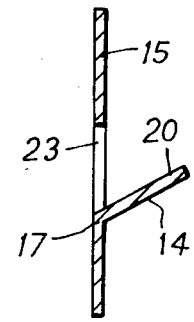
FIG. 4 is an enlarged view of the clamping portion of the central leaf spring in the built-in condition.
Figure 4:
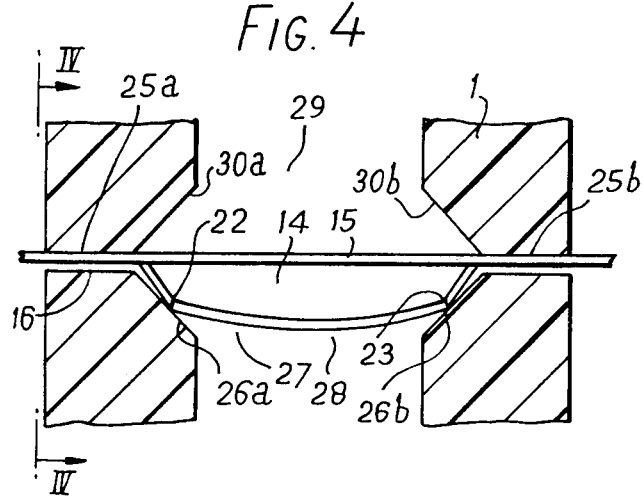
Figure 5:
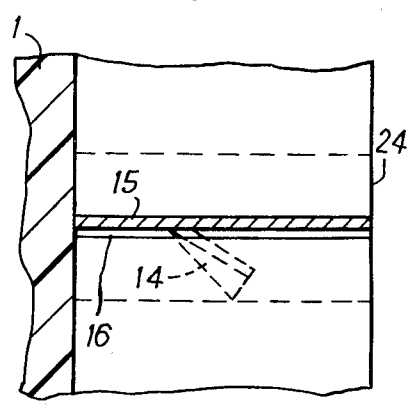
FIG. 5 is a section on the line V—V in FIG. 4.

As evident from FIGS. 4 and 5, each of the slots 16 open towards the side 24 possesses a, in this case two-part, first face 25a and 25b for abutment of the planar clamping portion, and a likewise two-part second face 26a and 26b in the form of two inclined shoulders that slope towards one another and serve for the abutment of those edges of the bent-out lug 14 that are formed by the corners 21 and 22.

If, now, the clamping portion 15 is pushed into the slot 16 with the base line of the lug 14 foremost, the lug is deformed in such a way that it assumes a smaller angle to the clamping portion 15. This deformation may be superimposed by a compression in the longitudinal direction so that the lug becomes bowed as shown in FIGS. 4 and 5. This deformation leads to considerable clamping forces which lock the leaf spring in an accurately predetermined position. These clamping forces do not, however, lead to deformation of the clamping portion 15 or even the leaf spring because they would have to be derived by way of the line 17 which, by reason of the angularly abutting sheet portions, is stiffened.

The inclined shoulders 26a and 26b form an enlargement 27 of the slot 16. This enlargement can be extended into a cavity 28 which extends between the inclined shoulders 26a and 26b as well as beyond same.

The upper and lower leaf springs 2 and 4 are each associated with a slot having an enlargement 27; the central leaf spring 3, however, is associated with a slot 16 having two enlargements that extend symmetrically to one another. Apart from the enlargement 27, therefore, this slot has an enlargement 29 which likewise comprises two inclined shoulders 30a and 30b.

On the whole, one obtains a very simple plug-in assembly in which the leaf springs automatically assume their correct position because the clamping portion can on one side of the slot lie against a carrier wall and because the lug not only serves for clamping but also for securing the position in the longitudinal direction. The leaf spring itself retains its predetermined prestressing which, of course, could be zero.

We claim:

1. A contact switch assembly comprising an insulated contact carrier having a U-shaped portion with spaced apart walls, a slot extending transversely through said walls, mutually facing recesses formed in said walls on at least one side of said slot, said recesses having oppositely inclined surfaces, a leaf spring contact in said slot having an attached resiliently hinged flap extending at an acute angle relative to the plane of said leaf spring contact, said flap having sharp corners at opposite ends thereof which dig into said inclined surfaces of said recesses to hold said flap in resilient biasing engagement with said inclined surfaces of said carrier to hold said leaf spring contact firmly in an inserted position.

2. A switch assembly according to claim 1 wherein said flap has three sides and is an integral part of said spring.

3. A switch assembly according to claim 2 wherein said flap is of trapezium shape.

* * * * *